United States Patent [19]
Becker et al.

[11] Patent Number: 4,673,578
[45] Date of Patent: * Jun. 16, 1987

[54] SNACK FOOD PRODUCT WITH HIGH DIETARY FIBER CONTENT AND PROCESS FOR PRODUCING THE SAME

[75] Inventors: Amy J. Becker, New York; James E. Bagan, Yonkers, both of N.Y.; Mario W. Medri, Short Hills, N.J.

[73] Assignee: Warner-Lambert Company, Morris Plains, N.J.

[*] Notice: The portion of the term of this patent subsequent to Feb. 4, 2003 has been disclaimed.

[21] Appl. No.: 793,369

[22] Filed: Oct. 31, 1985

Related U.S. Application Data

[63] Continuation of Ser. No. 493,451, May 11, 1983, Pat. No. 4,568,557.

[51] Int. Cl.$^4$ .............................................. A23L 1/00
[52] U.S. Cl. ...................................... 426/93; 426/618
[58] Field of Search ................... 426/93, 96, 103, 293, 426/618, 660, 516, 804, 808, 648, 658, 305, 307, 309, 810, 560, 601

[56] References Cited

U.S. PATENT DOCUMENTS 4,055,669 10/1977 Kelly et al. ......................... 426/307
4,259,359 3/1981 Spicer ................................. 426/808
4,296,141 10/1981 de Paolis ............................ 426/660
4,451,488 5/1984 Cook et al. ......................... 426/639
4,543,262 9/1985 Michnowski ....................... 426/306

FOREIGN PATENT DOCUMENTS 1561190 2/1980 United Kingdom ............... 426/516

OTHER PUBLICATIONS

*Candy & Snack Industry*, "Crunchola", Nov. 1976, pp. 24, 26 and 28.

*Primary Examiner*—Raymond N. Jones
*Assistant Examiner*—Carolyn Paden
*Attorney, Agent, or Firm*—Anne M. Kelly; Gary M. Nath

[57] ABSTRACT

A high dietary fiber-containing snack food product and process for making the same is disclosed. The product comprises from about 5 to about 30% by weight of dietary fiber, soaked in a food grade oil, for example, admixed with peanut butter such that the peanut oil becomes absorbed by the fiber, and further mixed with a compound coating. The compound coating serves as a binder and processing aid for extrusion of the mixture into shapes for immediate consumption. No baking, cooking, toasting or the like is necessary.

21 Claims, No Drawings

SNACK FOOD PRODUCT WITH HIGH DIETARY FIBER CONTENT AND PROCESS FOR PRODUCING THE SAME

This is a continuation of copending application Ser. No. 493,451 filed on May 11, 1983, now U.S. Pat. No. 4,568,557.

Numerous snack-food products are available for consumption in the form of cereals, granola-type bars and cookies. These products have become readily acceptable to consumers, particularly for those interested in foods containing grains and fruits. "Snack meals" have become an important substitution for traditional meals and the nutritional contribution of the former has therefore become increasingly important. For the most part, the products of the prior art have concentrated on the utilization of cereal proteins.

German Federal Republic Patent Application No. 2,746,479, filed 1979, to Bayer AG, concerns confectionery bars such as chocolate bonbons, etc., whereby shredded bran or vegetable fiber is added in the amount of 5-75% by weight.

It is known to use fibrous materials such as wheat bran and cellulose for a variety of baked and cooked products. U.S. Pat. No. 4,175,448 to Hayward et al. discloses a cereal protein fortified bar. U.S. Pat. Nos. 4,056,636 to Kelly et al., 3,903,308 to Ode, 3,925,567 to Able, 3,711,296 assigned to Beatrice Foods, U.K. 1,321,889 to National Biscuit Co., U.S. 3,532,509 to Gronberg and U.S. 3,540,890 to Benson are among the relevant patents dealing with snack foods and cereal containing products in snack food form. These are cited primarily as background.

Dietary fiber (bran-cellulose) in cookie products is discussed in the journal "Tennessee Farm and Home Science," 1979, No. 101, 21-24. This product concerned a dough which was baked. The "Journal of Food Science," 1979, 42, (6), 1428-1431 discusses the feasibility of increasing fiber with cellulose in cakes. A high-protein snack food using beanstalk (mungbean flour) with sesame seed and rice bran products is discussed in the "Thai Journal of Agriculture Science," 1974, 7, (2), 93-101.

A high protein food bar consisting of peanuts and grains bound together by peanut butter and sweeteners, which is then extruded and cut in bar shape and coated with carob is disclosed in "Food Product Development," 1981, 15, (3), 30. Its ingredients are peanut butter, cornsweet 90, carob coating, 62 DE corn syrup, soy bran, peanuts, isolated vegetable protein, wheat germ, natural vanilla flavoring, lecithin and is fortified to greater than or equal to 60% of the U.S. RDA for proteins, vitamins and minerals.

German Federal Republic Patent Application No. 2,845,571, 1980 discloses snacks rich in cellulose fiber wherein 10-20% moisture may be present and 10-80% of a filler consisting of bran, pure cellulose or other plant residue and 20-90% of a protein such as milk protein.

U.S. Pat. No. 3,917,861 to Viera et al., discloses a process for producing a breakfast cereal using delicate belt compaction to bond cereal particles together with a binder fat.

U.S. Pat. No. 4,304,768 to Staub et al., discloses a low-calorie food product containing dietary fiber present, at the level of ¼ to 2 times the level of polyols present, the purpose of the fiber being the reduction of diarrhea which ordinarily occurs with the use of polyol sweeteners. The products contemplated are baked goods, jams, pastas, noodles, toppings and confections.

U.S. Pat. No. 4,038,427, to Martin, discloses a snack food product produced by aggregating an assortment of amylaceous and proteinaceous particles around puffed and preferably at least partially cupped toasted cereal flakes which serve as focal points for the particles and thereby afford a multi-textured lower density and eating quality, the aggregates being preserved and agglomerated in a fat-syrup double or single coating. The preferred ingredients are coconut oil 10 to 20%, rolled oats 20 to 35%, wheat germ 0 to 25%, rolled whole wheat 2 to 25%, corn syrup 0 to 5% and oven-puffed rice flakes 0 to 25%. The products are intended to be of the granola-type and are prepared by spraying an aqueous solution of sugar onto oil coated wheat and oats. The initial individual moisture content of the wheat and oats is 8%. The particles subsequent to oil coating have a moisture content of 13% and are later dried to again reduce their moisture content to 6 to 8%.

U.S. Pat. No. 3,876,811 to Bonner et al., discloses a ready-to-eat cereal of natural ingredients consisting essentially of a base and a coating thereon, said base comprising 30 to 50 parts by weight cereal flakes, 5 to 8 parts coconut, 0 to 10 parts milk solids and 5 to 9 parts edible nuts; said coating comprising 12 to 24 parts brown sugar, 5 to 15 parts non-hydrogenated vegetable oil, ½ to 3 parts sugar; said cereal having a moisture content of 1 to 3½% by weight and a density of 0.15 to 0.35 oz. per cubic inch. The process of making this product requires oven drying to reduce moisture content subsequent to the addition of 1 to 3% by weight of water.

U.S. Pat. No. 4,315,954 to Knupers et al., concerns a dietary snack product rich in fiber produced by a process wherein a fiber-containing substance which is difficult to extrude by itself is mixed with a protein such as milk and water, to form a mixture having a moisture content between 8 and 25%, the mixture then being extruded at a temperature of at least 100° C. The resulting dietary product may contain 10 to 80% rich in fiber such as bran and 20 to 90% of plastifiable protein.

U.S. Pat. No. 3,868,471, discloses ready-to-eat cereals produced by coating a mixture of a raw cereal base and additional cereal grains with an edible oil, and permitting the oil to penetrate the cereal surface. A syrup coating is then applied, while agitating, to form clusters having a substantially continuous double film thereon. The clusters are then roasted and dried.

U.S. Pat. No. 4,143,163, to Hutchison, discloses an edible fibrous cellulose product encapsulated in a polyhydric alcohol and gum solution to produce a low calorie gum base product for use in the manufacture of foods.

U.S. Pat. No. 4,017,644 assigned to Searle, discloses a dietary high calorie food bar devoid of sodium, potassium and protein comprising a baked dough containing pregelatinized starch, an edible vegetable oil and sugar. The product is intended for renal patients who require a diet high in calories and restricted in sodium, potassium and protein content.

Breads, cereals, cakes and beverage mixes are known in the art to include what is commonly referred to as dietary fiber. These products have in common with those previously discussed the requirement of traditional baking, cooking, toasting, frying or other heat treatments to arrive at a desired product form and taste.

The instant invention concerns a nutritional snack-food and confectionery product and method of producing the same. The products of this invention are designed to be ready-to-eat snacks or confectionery items formed into convenient configurations for easy and immediate consumption. The instant products contain relatively high quantities of dietary fiber, yet do not suffer from the undesirable dry taste and fibrous mouthfeel that conventional high dietary fiber-containing products exhibit. A unique vehicle is provided for delivering a good-tasting, nutritious, relatively low calorie dietary fiber product. The dietary fiber is intimately admixed and aggregated by means of a high fat ingredient, which preferably contributes flavor and taste as well, and further combined with a compound coating. The compound coating serves to preserve and protect the dietary fiber and to aid in masking the fibrous mouthfeel and undesirable taste when consumed. Additionally, the instant products are fabricated without the use of the prior art techniques of baking, cooking, toasting and frying, among others, which were required for proper texture, form and taste. Further, the instant invention allows for preparation of a high content dietary fiber snack food product which is easily prepared with standard mixing techniques and which is then extruded into the final product. No initial or subsequent baking, toasting, frying or cooking of the formed product or ingredients is necessary. Sheets, bars, cookies and the like are contemplated as potential vehicle configurations for delivery of the dietary fiber. One objective of the instant invention is to make a snack food product which is high in dietary fiber yet does not suffer from a fibrous taste or mouthfeel when consumed.

Another objective of the instant invention concerns the use of a combination of a compound coating with a dietary fiber mixture to be made into a snack food product.

Another objective of the instant invention concerns a snack food product which is produced by simple mixing and extruding without the need for baking, cooking, toasting, frying or other such techniques, yet tastes crunchy and crispy.

Another objective of the instant invention concerns the process of making a snack food product whereby the critical step of allowing adequate absorption of a food grade oil by the fiber is employed, said step being a part of a series of mixing steps in a relegated order.

Numerous other objectives are contemplated in addition to those specifically mentioned above and will become apparent from the disclosure below.

As mentioned above, the instant invention concerns a nutritional snack food or confectionery product which comprises a dietary fiber component in the amount of about 5% to about 30% by weight of the total product and a compound coating in the amount of about 40% to about 70% by weight of the total product.

More particularly the edible snack food product of the instant invention comprises:

(A) dietary fiber in the amount of about 5% to about 30% by weight of the total product; and
(B) a compound coating for said dietary fiber in the amount of about 40% to about 65% by weight of the total product comprising:
  (1) a fat portion in an amount of about 25% to about 55% by weight of the compound coating;
  (2) at least one sweetener in the amount of about 30% to about 60% of the compound coating;
  (3) milk solids in an amount up to about 30% by weight of the compound coating;
  (4) yogurt in the amount up to about 30% by weight of the compound coating; and
  (5) flavoring agent in an amount up to about 10% by weight of the compound coating.

The use of the term "fiber" is often used as a catchall for what has become known as the sum of crude fiber and dietary fiber.

Crude fiber is generally understood to mean the residue left after boiling the food in dilute caustic and then in dilute acid. This method recovers about 50-80% of cellulose, about 10-50% of lignin and about 20% of hemicellulose.

Generally, for purposes of the present invention the term "dietary fiber" is intended to mean any food which when ingested in a monogastric animal, especially a human, reaches the large intestine essentially unchanged. In essence, dietary fiber is understood to mean those constituents derived from botanical materials which are resistant to human digestive enzymes. The term "dietary fiber complex" is, for purposes of this invention, to be used interchangeably with the term dietary fiber, the former providing a larger definitional umbrella for products such as microbial and algal gums, which are also resistant to animal digestive enzymes. Although these materials bear little resemblance to a true fibrous material, they have in common with the true fiber, digestive resistance and serve as microbial substrates or contribute to unfermented and undigested matter of the feces.

Dietary fiber is more particularly defined as the sum of all polysaccharides and lignin that are not digested by the endogenous secretions of the human digestive tract. The polysaccharides are derived from either the plant cell-wall or cell-content. Those carbohydrates which are contained in the plant cell-wall include gums, mucilages, pectins, pectin substances, algal polysaccharides and hemicelluloses. All of these carbohydrate materials are classified as polysaccharides. Thus, for purposes of this invention, dietary fiber includes the above polysaccharides in addition to cellulose and lignin, individually or in combination, derived from one or more plant varieties or species.

Although the term "fiber" commonly is used to refer to filamentous string-like materials, dietary fiber is generally gelatinous or mucilaginous in character.

Scientific literature is replete with the physiological effects and benefits of dietary fiber in the diet. Among those benefits are included bowel normalization, prevention of various colonic diseases such as diverticulosis, therapeutic treatment for diabetes, hypoglycemia, hypercholesterolemia, hypertriglyceridemia and respiratory diseases as well as a control for metabolic rates to help prevent obesity.

For example, a snack food product with the compositions of the instant invention can be designed to be a diet aid. Ingestion of approximately 1 to about 7 grams of dietary fiber just prior to a meal will serve to lower calorie intake at the meal. More preferably, the amount of dietary fiber would be in the amounts of about 3 to about 5 grams per dosage or unit of product. Such a product can be formulated into vehicles ranging from a sheet or candy bar, to a pudding, or even a medicament.

A line of food products or food supplements using the dietary fiber Products of the instant invention can be specifically formulated to help delay glucose absorption and reduce postprandial glucose and insulin serum peaks. Such a product would be intended as a therapeutic for diabetes and similar diseases.

Bran and other cellulose-derived dietary fibers have long been known as bulking agents due to their capacity to absorb water and soften stools, thereby increasing the speed of intestinal transit time. Such a bowel-normalizing product can be easily delivered by the compositions of the instant invention in the form of a snack food product. The amount of dietary fiber used would be determined by the amount necessary to produce laxative effects in a majority of the population, e.g. from about 6 to about 8 grams of dietary fiber per dosage or product form is contemplated.

Epidemiological evidence has fairly convincingly established that a high dietary fiber diet lowers the incidence of diverticular diseases of the colon. The cellulose and hemicellulose varieties of dietary fiber are believed to be largely responsible for this benefit.

For a more detailed discussion on the effects of dietary fiber on man see *Medical Aspects of Dietary Fiber*, Spiller, Gene A., and Kay, Ruth McPhersen, editors, Plenum Medical Book Company, New York, N.Y., 1980.

For purposes of the instant invention, the dietary fiber can be of the cellulose, hemicellulose, pectin and lignin types or combinations thereof.

Cellulose is a long, linear glucose polymer and is the beta isomer of starch. While wheat and corn bran are the most commonly used food source of cellulose fiber, numerous other brans, germs, grains and flours contain cellulose.

Hemicellulose are polysaccharides derived from the structured cell-walls of plants. They are generally extractable by cold aqueous alkali and are composed of $\beta$-1,4-linked pyranoside sugars. The largest chemical groups of the hemicelluloses are the pentosans, xylans and arabinoxylans. Additionally, hexose polymers, such as galactans, and acidic hemicelluloses, such as galacturonic acid or glucuronic acid, are other chemical groups within the hemicellulose family. Hemicelluloses are considered to be precursors of cellulose and together with pectin form the plant cell-wall in which are emeshed cellulose fibers.

Pectins are a complex group of polysaccharides in which D-galacturonic acid is a principal constituent. They are highly water-soluble and are present mainly in the primary cell-wall and intracellular layers of fruits and vegetables. Under suitable conditions and in the presence of sugar and acid, e.g. in the stomach, pectins are capable of forming gels. This ability to form gels coupled with its ion-binding capacity and susceptibility to nearly complete metabolization by colonic bacteria, is believed to play an important role in nutrition.

Lignin is the only known non-polysaccharide component of dietary fiber. As a complex, random inert polymer, it demonstrates the greatest resistance of all the dietary fibers to digestion. It is an aromatic compound based on coniferyl and sinapyl alcohols of molecular weight about 10,000 and occurs most frequently in the woody tissues of plants. It has been shown to bind bile acids.

Dietary fiber can be derived from nuts and seeds as well as grains, vegetables and fruits. Grains such as corn, wheat, barley, rye, soy, rice, oats and mixtures thereof, are known to be dietary fiber sources and are contemplated within the scope of this invention. The bran portion of the grain is especially useful. Of particular importance and preference is corn and wheat bran.

Flours made from the above grains are also useful in the instant invention. Also useful is the germ from these grains, again the preferred being from corn. These dietary fiber sources can be used individually or in combination, the proportions of which can be varied to accommodate desired fiber content, taste, mouthfeel and texture, all of which are considered well within the skill of the art and determinable through routine experimentation.

Most preferably, the combination of dietary fiber sources comprises the combination of corn bran and corn germ in the amounts of about 5% to about 30% by weight of the total product, and preferably in the amounts of about 6% to 10% by weight of the total product. Another preferred embodiment of the instant invention employs corn bran in the amounts of about 6% to 10% and up to 10% of corn germ by weight of the total product.

Ordinarily the dietary fiber is available in solid or powder form as a result of milling or grinding. Particle size is indicated through screen analysis. For purposes of the instant invention, particle size of the dietary fiber should preferably be a medium or fine grade for proper texture and mouthfeel. Regular grade particle size is, however, useful if a rougher, courser texture is desired. Combinations of particle sizes are also contemplated. The most preferred particle sizes for corn bran is a 50:50 ratio of medium to fine. In this instance "medium" is defined as a particle size such that 33% passes through a #60 standard U.S. screen size, and "fine" is defined as a particle size such that 20% passes through a #60 screen size.

The compound coating of the instant invention serves several important functions, the first being as a binder for the dietary fiber. Additionally, however, the coating serves to protect and preserve the fiber both from excess moisture and from drying out. Most importantly, the compound coating effectively masks and reduces the fibrous mouthfeel ordinarily associated with dietary fiber, hence making the product more desirable to the consumer. The compound coating also functions as a processing aid which serves to facilitate extrusion of the fibrous product into smooth sheets which are then cut into pieces or dosage sizes for consumption. The compound coating is generally present from about 40% to about 65% by weight of the product, and preferably in the amounts of about 45% to about 50%. Most preferably the compound coating is present in the amounts of about 45 to about 47% by weight of the product. The compound coating may contain a number of ingredients, but essential to its make-up are a fat portion and a sweetener. Thus, in one embodiment the compound coating comprises:

(1) a fat portion in the amount of about 25% to about 55% by weight of the compound coating;
(2) a sweetener in the amount of about 30% to about 60% of the compound coating;
(3) milk solids in an amount up to about 30% by weight of the compound coating;
(4) yogurt in the amount up to about 30% by weight of the compound coating; and
(5) at least one flavoring agent in an amount up to about 10% by weight of the compound coating.

The fat portion is preferably present in the compound coating in the amounts of about 25 to about 40% by weight of the compound coating and most preferably about 29% to about 32% by weight of the compound coating.

The fat portion of the compound coating may comprise a single fat or a combination of fats. The groups of fats which are useful are quite broad and are selected from the group consisting of fractionated fats, hydrogenated oils, partially hydrogenated oils, unsaturated oils and mixtures thereof. In general terms, domestic fats and oils, also known as to those skilled in the art as non-lauric ester containing fats, are useful as well as those known in lauric ester-containing fats and oils. The term "fats" and "oils" are used by the applicant interchangeably, although there may be differences as understood by the skilled artisan. "Fats" is generally a term to refer to the solid embodiment of the above-mentioned groups and "oils" refers to the liquid form. For purposes of this invention, the fat or mixtures of fats in the compound coating have a melting point of about 90° to about 110° F. to properly crystallize and hold the product shape subsequent to extrusion and cooling. More specifically, as a subclass of these, the fat portion of the compound coating is selected from the group consisting of coconut oil, palm oil, palm kernel oil, cottonseed oil, safflower oil, sunflower oil, soy oil, corn oil and mixtures thereof. Of particular importance is the combination of palm kernel oil with palm oil in the respective amounts of about 29% to about 32% and 0.5% to about 0.6% by weight of the compound coating. In general, the combination of a fully hydrogenated non-lauric oil, such as palm oil, with a partially hydrogenated or, fractionated non-hydrogenated lauric oil such as palm kernel oil, is especially useful in processing and is critical to the economics of manufacturing.

The addition of the fully hydrogenated oil to the fractionated non-hydrogenated oil permits the fat mixture to harden, e.g., crystallize faster at ambient temperatures. This allows for the final products to become fully set and ready for packaging soon after extruding, since the product must solidify before handling and packaging can begin. In other words, the addition of a fat which has a higher melting point to the compound coating serves a valuable purposes from a processing standpoint. The cost savings associated with conservation of time in processing is important to the commercial feasibility of the final product.

The other essential ingredient comprising the compound coating is a sweetening agent. Although the amount of sweetener may be varied within the broad ranges of about 30% to about 60% by weight of the compound coating, it is preferred that the sweetener be a granulated sugar present in the range of about 40% to about 50% by weight of the compound coating. The most preferred amount of sugar is 48% by weight of the compound coating.

The particular sweetener chosen is critical to the invention. The sweetener must be sufficient in physical make-up to provide adequate bulk and texture to the compound coating. Those sugars which provide sufficient bulk are the monosaccharides and dissacharides. The preferred sugar is sucrose. Minor amounts of other monosaccharides and polysaccharides as well as polyhydric alcohols and artificial sweeteners may be useful to adjust the sweetness level.

The addition of milk solids to the compound coating is optional but preferred. Milk solids may be derived from the group consisting of whole milk, non-fat milk, cream, whey, soy protein, casein as well as artificial non-dairy creamers. Combinations of milk solids are also useful. These ingredients are generally in powder form and are mixed into the compound coating along with the fat portion and sweetener. Non-fat milk powder is the most preferred of this group and is present in the compound coating in the range of about 12% to about 16% by weight of the compound coating.

Yogurt, albeit optional to the invention as a whole, is included in those embodiments which are preferred. As described in the Code of Federal Regulations, yogurt is the food produced by culturing cream, milk, partially skimmed milk or skim milk, individually or in combination, with a characterizing bacterial culture containing lactic acid-producing bacteria. Among those species of bacteria capable of lactic acid production are *Lactobacillus bulgaricus, Lactobacillus helvericus* and *Streptococcus thermophilus*. Low fat yogurt, that is, yogurt containing between about 0.5% to about 2% milk fat and greater than about 8.25% milk solids not fat, is also useful in the instant invention. Various flavors of yogurt are useful, and are chosen depending on the desired taste and flavor.

The flavoring agents may be chosen from food ingredients which impart a flavor or by the direct addition of flavors abstracted from foods. For example, those foods which may be directly added for flavoring are selected from the general class of dried fruits and nuts. Dried peaches, apricots, orange rind and raisins are among those fruits readily employable. It is important to the processing of the ingredients of the final product that moisture be kept to a minimum. Hence, fruits which have a relatively high moisture content, even though dried, should be added as a last step prior to extrusion.

Honey, molasses, peanut butter and germ may also be employed as flavoring agents. Peanut butter, as previously mentioned, is the preferred material added to the dietary fiber mixture prior to subsequent mixing with the compound coating. Peanut butter may therefore serve a dual purpose, being useful for its oil content to wet the fiber and for its flavor. Honey adds sweetess as well as flavor.

Excess moisture is undesirable for both the processing procedure and the finished product. Yet the final product must not be so dry as to give a perceptible fibrous mouthfeel. Thus, a critical moisture content and balance is essential to the invention. Thus, the ingredients of both the compound coating and dietary fiber mixture are initially either solid, dry powder or oil, with a minimum of moisture content. The moisture content of the compound coating, for example, should be kept as low as about 0.1% if possible, but should not be higher than about 4%. Most preferably the moisture content of the compound coating should be in the range of about 0.5% to about 0.75%. Too much moisture present in the fiber/oil mixture prior to further mixture with the compound coating causes a fudge-like consistency which is unacceptable for the extrusion technique of the present invention. The final viscosity range of the compound coating prior to admixture with the dietary fiber should be the range of about 85° to about 95° Mac-Michael at 120° F., 20 CM bob 15 RPM, 3 centimeter emersion, #26 torsion wire.

Emulsifiers, adjuvants and other well known confectionery additives may be added to adjust the viscosity, rheology or other physical or chemical property to the desired level. Lecithin is the preferred emulsifier and is added in quantities sufficient to insure the viscosity levels cited above. Mono- and diglycerides are also useful emulsifiers. Additives designed to cut the sweetness may also be added. For example, pulverized citric acid crystals may be added in small amounts for this purpose. The amounts of these additives are not critical to an understanding of the invention.

Other flavors which are useful in the present invention are selected from the class consisting of vanilla extract, vanillin, chocolate extract, almond extract, orange oil, lemon oil, apple essence, spearmint oil, raspberry essence, strawberry essence, cherry essence, pineapple essence, grape oil, lime oil, grapefruit oil and a combination thereof.

If the flavoring agent be selected from the above class it should be present in the amount of up to 1% by weight of the compound coating.

Should a fruit, cereal or nut be added to impart additional flavoring, the amount, individual or in combination, should be up to about 16% by weight of the total product.

As previously disclosed the invention also concerns a process of making a snack food product comprising the steps of:
(1) pre-mixing dietary fiber with an oil derived from a food grade product wherein the dietary fiber absorbs the oil;
(2) pre-mixing a compound coating with a viscosity modifier selected from the group consisting of lecithin, monoglycerides and diglycerides, wherein the compound coating comprises:
 (a) a fat portion in an amount of about 25% to about 55% by weight of the coating;
 (b) sweetener in the amount of about 30% to about 60% of the coating;
 (c) milk solids in an amount up to about 30% by weight of the coating;
 (d) yogurt in the amount up to about 30% by weight of the coating; and
 (e) a flavoring agent in up to about 10% by weight of the coating;
(3) blending the pre-mix of (1) with the pre-mix of (2) to obtain a homogeneous mixture;
(4) optionally adding to the mixture of (3) a cereal product to obtain the desired texture and dried fruits and nuts for flavor;
(5) extruding the resulting mixture at a temperature between about 95° F. to about 125° F. into the desired shape.

Additionally, the above process may also include the steps of:
(1) forming a compound coating to be used to bind fiber comprising:
 (a) melting a quantity of fractionated fat at a temperature of about 95° to about 120° in a standard mixer; adding milk solids and sweeteners thereto and optionally molasses, honey or yogurt and blending this resulting mixture until homogeneous;
 (b) refining the mixture of (a) to reduce granulation to a particle size of approximately 11 to 12 ten thousandths of an inch.
 (c) remelting the refined mixture of (b) in a kettle at a temperature of about 110° to about 120° and adjusting the viscosity with additional fractionated fat or an emulsifier to obtain a viscosity of 85°–95° MacMichael;
 (d) adding a flavor agent selected from the group consisting of vanilla extract, vanillin, honey, yogurt, molasses, and mixtures thereof;
(2) pre-mixing a quantity of powdered dietary fiber with a food grade oil such that the fiber absorbs the oil;
(3) blending the pre-mix of step (2) with the compound coating of step (1);
(4) extruding the mixture at a temperature of between about 100° F. to about 125° F. into a sheet or bar and allowing to cool at room temperature.

The invention will be further understood from the following examples which are intended to illustrate preferred embodiments and are not intended to limit the effective scope of the claims.

EXAMPLES I-X

TABLE I

EXAMPLES I-X
% by weight of total product

| Ingredient | I | II | III | IV | V | VI | VII | VIII | IX | X |
|---|---|---|---|---|---|---|---|---|---|---|
| Compound Coating** | 45.0 | 45.0 | 46.0 | 65.3 | 44.25 | 67.77 | 47.73 | 44.7 | 65.4 | 73.6 |
| Citric Acid | 0.2 | 0.2 | 0.2 | — | — | — | .38 | .69 | — | — |
| Lecithin | 0.1 | 0.1 | 0.1 | .14 | .19 | .15 | .14 | .20 | — | — |
| ****Peanut Butter | 10.5 | 8.5 | 16.0 | 10.80 | 7.31 | 7.46 | — | — | 7.1 | 8.0 |
| ***Corn Bran | 11.0 | 10.5 | 15.0 | 16.54 | 9.75 | 17.16 | 15.20 | 11.38 | — | — |
| *Raisins | 4.7 | 7.5 | 5.0 | — | 7.31 | — | 4.88 | 4.88 | — | — |
| ***Corn Germ | 8.0 | 6.5 | 5.7 | — | 2.92 | 3.73 | 7.60 | 5.69 | 11.1 | — |
| *Dried Apricots | 6.0 | — | — | — | — | — | — | — | — | — |
| *Dried Peaches | 3.5 | — | — | — | — | — | — | — | — | — |
| *Almonds or Coconut | — | 3.0 | 4.0 | — | 1.95 | — | 5.96 | 5.69 | — | — |
| *Krisp Rice | 5.0 | 7.2 | 4.0 | 7.22 | 9.75 | 3.73 | 5.96 | 4.47 | — | — |
| *Corn Flakes | 6.0 | 11.5 | 4.0 | — | — | — | 5.96 | 3.82 | — | — |
| ***Rolled Oats | — | — | — | — | 1.95 | — | — | — | — | — |
| Hydrogenated Palm Kernal Oil | — | — | — | — | — | — | 4.34 | 5.69 | — | — |
| *Dried Orange Rind | — | — | — | — | — | — | 1.63 | 5.69 | — | — |
| *Orange Oil | — | — | — | — | — | — | .22 | .24 | — | — |
| ***Crystalline Cellulose | — | — | — | — | — | — | — | — | 16.4 | 18.4 |

*Flavoring agents
**Table II discloses compound coating ingredients
***Dietary Fiber Source
****Admixed with compound coating as source of food grade oil to wet fiber.

TABLE II

| | Compound Coating |
|---|---|
| Ingredient | % by weight of the coating |
| fractionated fat* | 30% |
| granulated sugar | 47.5% |
| non-fat milk solids | 14% |
| yogurt | 2% |
| honey | 5% |
| molasses | 1% |
| lecithin | 0.4% |

TABLE II-continued

| | Compound Coating | |
|---|---|
| Ingredient | % by weight of the coating |
| vanilla extract | 0.1% |

*The fractionated fat comprises 28% palm kernel oil and 2% palm oil.

From the ten compositions given above, snack food products were made using the process previously disclosed. The products were found to be good-tasting and have high nutritional value and high dietary fiber content.

Examples I, II and II are the most preferred of the formulations.

The invention being thus described, it will be obvious that the same may be varied in many ways. Such variations are not to be regarded as a departure from the spirit and scope of the invention and all such modifications are intended to be included within the scope of the claims.

What is claimed is:

1. An uncooked edible snack food product prepared by a process which comprises the steps of:
   (A) pre-mixing about 5% to about 30% by weight of an uncooked dietary fiber, based on the total weight of the snack food product, with an oil derived from a food grade product, wherein the dietary fiber absorbs the oil;
   (B) pre-mixing about 40% to about 65% by weight of an uncooked compound coating, based on the total weight of the snack food product, with a viscosity modifier selected from the group consisting of lecithin, monoglycerides and diglycerides, said compound coating comprising:
      (1) a fat portion in an amount of about 25% to about 55% by weight of the compound coating;
      (2) sweetener in an amount of about 30% to about 60% by weight of the compound coating;
      (3) milk solids in an amount up to about 30% by weight of the compound coating;
      (4) yogurt in an amount up to about 30% by weight of the compound coating; and
      (5) at least one flavoring agent in an amount up to about 10% by weight of the compound coating;
   (C) blending the pre-mixes of steps (A) and (B) to obtain a homogeneous mixture; and
   (D) adding to the mixture of (C) up to about 16% by weight, based on the total weight of the snack food product, of an additive selected from the group consisting of dried fruit, cereal and nuts to obtain the desired texture and flavor; and
   (E) extruding the resulting mixture at a temperature between about 100° F. to about 125° F. into the desired shape and allowing to cool.

2. The snack food product prepared according to claim 1 wherein the dietary fiber is selected from the group consisting of cellulose, hemicellulose, pectin and lignin.

3. The snack food product prepared according to claim 1 wherein the dietary fiber is derived from a vegetable, fruit, grain, nut, seed or mixtures thereof.

4. The snack food product prepared according to claim 3 wherein the dietary fiber is the bran portion of a grain selected from the group consisting of corn, wheat, oats, barley, soy, rye, rice and mixtures thereof.

5. The snack food product prepared according to claim 3 wherein the dietary fiber is the germ portion of a grain selected from the group consisting of corn, wheat, oats, barley, soy, rye, rice and mixtures thereof.

6. The snack food product prepared according to claim 3 wherein the dietary fiber is contained in a mixture of corn bran and corn germ in the amounts of about 6% to about 18% of corn bran and up to about 10% of corn germ, by weight of the total product.

7. The snack food product prepared according to claim 6 wherein the fat portion of the compound coating is palm kernel oil in the amount of about 25% to about 40%.

8. The snack food product prepared according to claim 1 wherein the fat portion of the compound coating is selected from the group consisting of fractionated fat, hydrogenated oils, partially hydrogenated oils, unsaturated oils and mixtures thereof.

9. The snack food product prepared according to claim 8 wherein the fat portion of the compound coating is selected from the group consisting of coconut oil, palm oil, palm kernel oil, cottonseed oil, safflower oil, sunflower oil, soy oil, corn oil and mixtures thereof.

10. The snack food product prepared according to claim 1 wherein the milk solids portion of the compound coating is selected from the group consisting of solids of whole milk, non-fat milk, cream, whey, soy protein, casein, artificial non-dairy creamers and combinations thereof.

11. The snack food product prepared according to claim 10 wherein the milk solids portion of the compound coating is present in the amount of about 10% to about 17% by weight of the compound coating.

12. The snack food product prepared according to claim 1 wherein the milk solids portion of the compound coating are non-fat milk solids present in the amount of 14% by weight of the compound coating.

13. The snack food product prepared according to claim 1 wherein the sweetener portion of the compound coating is selected from the group consisting of monosaccharides, disaccharides and combinations thereof.

14. The snack food product prepared according to claim 13 wherein there is additionally included a minor amount of artificial sweetener.

15. The snack food product prepared according to claim 14 wherein the artificial sweetener is saccharine or aspartame.

16. The snack food product prepared according to claim 13 wherein the disaccharide is sucrose.

17. The snack food product prepared according to claim 1 wherein the flavor imparting food is peanut butter in the amount of about 7% to about 16% by weight of the product.

18. The snack food product prepared according to claim 1 wherein the flavoring agent (5) is selected from the class consisting of vanilla extract, vanillin, chocolate extract, orange extract, lemon extract, almond extract, orange oil, lemon oil, apple essence, spearmint oil, peppermint oil, wintergreen oil, raspberry essence, strawberry essence, cherry essence, pineapple essence, grape oil, lime oil, grapefruit oil and a combination thereof.

19. The snack food product prepared according to claim 1, wherein the moisture content of the compound coating is from about 0.1% to about 4% by weight, based on the weight of the compound coating.

20. An uncooked edible snack food prepared by a process which comprises the steps of:
   (A) pre-mixing about 12% to about 25% by weight, based on the total weight of the snack food product, of an uncooked dietary fiber mixture derived from corn bran and corn germ, with an oil derived from a food grade product, wherein the dietary fiber absorbs the oil;

(B) pre-mixing about 45% to about 65% by weight of an uncooked compound coating, based on the total weight of the snack food product, with a viscosity modifier selected from the group consisting of lecithin, monoglycerides and diglycerides, said compound coating comprising:
  (1) a fat portion comprising about 28% fractionated palm kernel oil and about 2% hydrogenated palm oil by weight of the compound coating,
  (2) a sweetener comprising granulated sugar in the amount of about 48% by weight of the compound coating,
  (3) non-fat milk solids present in the amount of about 14% by weight of the compound coating,
  (4) yogurt present in the amount of about 2% by weight of the compound coating,
  (5) flavoring agent comprising an admixture consisting essentially of about 0.1% vanilla extract, about 5% honey, and about 1% molasses, all by weight of the compound coating, (C) blending the pre-mixes of steps (A) and (B) to obtain a homogeneous mixture; and (D) adding to the mixture of (C) up to about 16% by weight, based on the total weight of the snack food product, of an additive selected from the group consisting of dried fruit, cereal and nuts to obtain the desired texture and flavor; and (E) extruding the resulting mixture at a temperature between about 100° F. to about 125° F. into the desired shape and allowing to cool.

21. The snack food product prepared according to claim 20 wherein the moisture content of the compound coating is from about 0.5% to about 0.75% by weight, based on the weight of the compound coating.

* * * * *